United States Patent [19]

Tonkin

[11] Patent Number: 4,742,555

[45] Date of Patent: May 3, 1988

[54] PATTERN PROCESSOR CONTROLLED ILLUMINATOR

[75] Inventor: Steven W. Tonkin, Shoreview, Minn.

[73] Assignee: Pattern Processing Technologies, Inc., Minnetonka, Minn.

[21] Appl. No.: 913,233

[22] Filed: Sep. 30, 1986

[51] Int. Cl.[4] .............................................. G06K 9/38
[52] U.S. Cl. ........................................ 382/50; 382/68
[58] Field of Search ............................ 382/50, 65, 68; 250/222.1, 223 R, 574, 205, 221; 358/107; 364/134

[56] References Cited

U.S. PATENT DOCUMENTS

| 4,408,231 | 10/1983 | Bushaw et al. | 382/50 |
| 4,481,667 | 11/1984 | Price et al. | 382/65 |
| 4,541,115 | 9/1985 | Werth | 282/14 |
| 4,553,847 | 11/1985 | Lang | 356/445 |

Primary Examiner—H. Broome
Assistant Examiner—Lincoln Donovan
Attorney, Agent, or Firm—Kinney & Lange

[57] ABSTRACT

A controller for operating an illumination source to illuminate selected objects to provide an image to an image transducer so that the illumination occurs at, or approximately at, the moment of time that the image of the object is desired to be acquired. An image signal manipulator receives signals corresponding to the image from the transducer.

8 Claims, 2 Drawing Sheets

PATTERN PROCESSOR CONTROLLED ILLUMINATOR

Reference is hereby made to U.S. Pat. No. 4,451,115 by Larry J. Werth, entitled Pattern Processing System, which was issued on Sept. 10, 1985. This patent discloses a pattern processing system used in detecting patterns in information received thereby.

BACKGROUND OF THE INVENTION

Field of the Invention

The present invention relates to providing illumination for image storage and manipulation systems and, more particularly, to such systems concerned with images of objects moving through scenes being sensed by such systems.

There are many uses for systems which capture electromagnetic radiation images of scenes, including light images, and then perform manipulations on the images or their representations after such capture to detect or identify one or more aspects of such scenes. Such uses include surveillance for security purposes, sensing for robots or other controlled machines, inspection of results from operations performed on objects, sorting various kinds of objects for quality, size, and the like, identification, etc.

Among several of these uses, the situation arises where the scenes from which images are to be obtained will have objects of interest moving therethrough at a relatively fast rate with respect to the system acquiring the images of that scene. In many of those instances, instances which often arise in the operation of sorting or inspection, there is no particular interest in following the object through its path of travel, but rather a single sharp image is needed of each object passing through the scene, i.e., that which is on the sensing range of the system. Having acquired such an image, the system can then perform various pattern recognition manipulations to ascertain aspects of the object that are of interest.

If the object moves rapidly enough through the scene being sensed by the system, the image obtained will be blurred rather than sharp because the object will move appreciably during the time that the scene image is being acquired. The transducer typically used in acquiring an image of the scene is a television camera which provides video data in the RS-170 format, a standard promulgated by The Electronics Industry Association (EIA). Under this standard, a scene is represented as a series of images, or frames, one such image being acquired every thirtieth of a second. Each such image is acquired by having the scene illuminated such that the resulting reflected illumination from the surfaces in the scene is arranged to reach the image reception plane of the camera where the resulting image is converted into electrical signals. This conversion takes place at the image reception plane on the basis of considering that plane divided into five hundred twenty-five horizontal lines such an electrical signal is provided which is a sequence of analogs of the light intensity occurring on each of these lines due to the image occurring there of the scene.

The RS-170 standard requires that the signals representing images obtained by the camera be arranged so that they can control a television receiver, or monitor, operated by having an electron beam therein periodically scan five hundred twenty-five lines on a fluorescent material image reconstruction surface. Electrical signals representing the image are arranged to have every other line scanned first to form one field, and thereafter the remaining lines scanned to provide the second field, the electrical signals from these two fields being interlaced to recreate the scene in the frame based providing each of these two fields on the image reconstruction surface. This scanning, to provide two video fields for a video frame, is repeated thirty times a second (fields are thus scanned sixty times a second) to provide what appears to be a continuous image on television monitor, but what appears as a series of frames to an image storage and manipulation system.

The electrical signals from the camera representing the image are in the form of a sequence of signal portions each of which is the analog of, and represents, the light intensity occurring on a line of the image reception plane. Members of this sequence are separated by horizontal blanking and synchronism pulses which indicate separations between electrical signals resulting from each horizontal line scan, and vertical blanking and synchronism pulses which indicate the separation between the series of signals representing each scanning field, or each vertical scan, again with every two successive such video fields forming a video frame.

With each video frame taking approximately a thirieth of a second to assemble in terms of forming an electrical signal representation of every other line of the image applied during that time, objects which can move appreciably in the scene in such time durations will appear blurred in such an arrangement. A method for overcoming this blurring would be to acquire an image from the moving object in a short burst of illumination so that the camera could effectively sense the scene only during that period of time the illumination burst occurs. If the camera is set to take in relatively little illumination and the burst of illumination is quite bright relative to the light taken in in the absence of such a burst, the camera, in effect, will take a picture of the scene only during the burst.

If the duration of the burst of light is quite short so that a moving object does not move appreciably during that duration, the object will appear to not move past the camera during the frame so that with a sufficiently bright burst of light a sharp image will be obtained of the entire scene without any blurring due to the moving object. This requires a camera, however, that can store the image acquired during the burst for the rest of the frame. Such a camera could be a charge-coupled device based image reception plane camera.

A further problem which must be solved is that the burst of illumination must be made to occur at the time the moving object is in the desired position in the scene for purposes of having its image acquired. A possible way of controlling a burst of illumination is to have the source thereof initiate an illumination burst once in each frame based on a signal from the camera, or the image storage manipulation system, which is provided at a fixed point during the scanning period in which the frame is obtained. Such a stroboscopic illumination arrangement means, however, that the light is provided in synchronism with the frame rate of the camera rather than being based on the presence of the moving object at the desired image point in the scene a the moment an illumination burst is initiated.

As a result of such frame rate synchronism, the object would be at an unknown point with respect to the scene at the time the scene image is acquired. For a sequence of objects moving through the scene, such as objects to be inspected on a conveyor belt, each successive object could appear at a different point in the scene because its arrival on the scene and the initiation of a burst of illumination are not synchronized with each other. Such a result can lead to problems in providing a complete or properly focused image for acquisition by the image storage and manipulation system, which can lead to poor results in sorting or inspecting such objects. A desirable arrangement would be to synchronize the burst of illumination with the arrival of the moving object at a desired point in the scene.

A further difficulty arises even for a system which is able to provide such a desirable synchronization. Television cameras which acquire an image of the scene, and provide electrical signals representing it, have points during a scanning period for forming a frame in which they are unable to provide electrical signals representing the image. Should a burst of illumination occur during such a period of time, the image for that frame could be distorted or lost. In a camera relying on a charge-coupled device image reception plane as the place where an image is acquired and transformed into representative electrical signals, the point in a scanning period where the accumulated charge (accumulated by the photoreceptors because of an image portion following thereon) is placed into the transfer registers for shifting out to form the corresponding image signals, or video data, is a point in which an image falling on the photoreceptors cannot be reliably transformed into electrical signals. Thus, a system providing the desired illumination-moving object synchronization must also avoid having the illumination burst occur during such a point in time at which the camera cannot provide electrical signals representative of the image caused by the illumination burst.

SUMMARY OF THE INVENTION

The present invention provides a controller for operating an illumination source to illuminate selected objects to provide an image to an image transducer so that the illumination occurs at, or approximately at, the moment of time that the image of the object is desired to be acquired. The controller operates using signals representing scanning and a user initiated signal indicating an image of the object is to be provided to the transducer. The controller generates a signal to cause the illumination to occur subject to any delay required to avoid points in the scanning period when the transducer is unable to supply electrical signals representative of a complete image occurring therein.

DETAILED DESCRIPTION OF THE PREFERRED EMBODIMENTS

Figure 1:
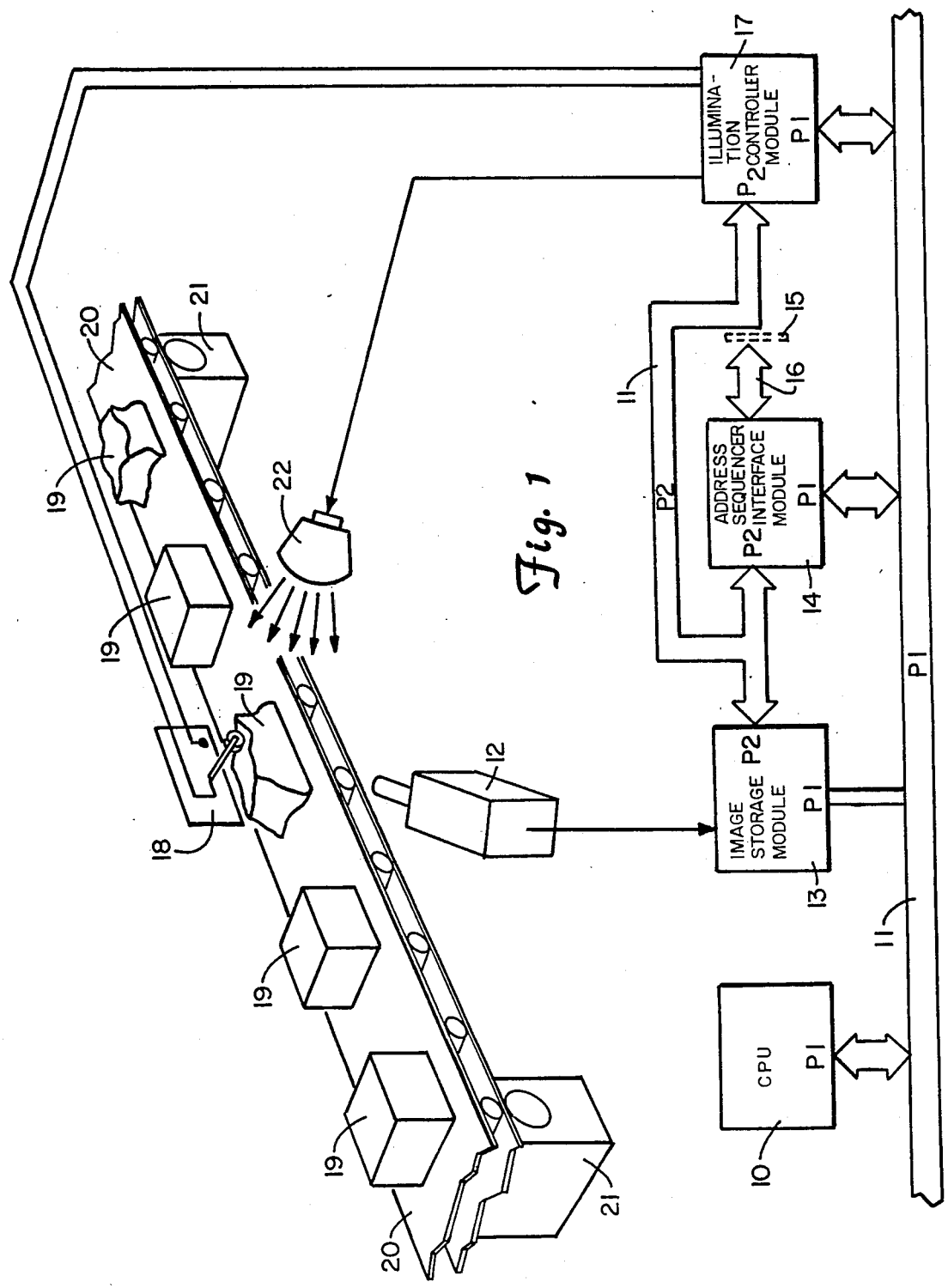
FIG. 1 shows a schematic system diagram of the present invention having an image storage and manipulation system portion with an image transducer and showing an illumination controller and the illuminator.

FIG. 1 is a schematic system diagram of a portion of an image storage and manipulation system with the capability of acquiring images of scenes of interest based on asynchronous stroboscopic illumination. That is, the illumination for each image forming a frame is initiated by the system in response to an externally supplied indication that an object of interest is at a location in the scene being sensed at which it is desired to have its image acquired.

The system operates under control of a central processing unit, 10, which can be a 88/25 central processing unit board manufactured by Intel Corporation. Central processing unit 10 communicates with other portions of the system through one portion of a communication bus, 11, termed Port 1, the bus system being the Multibus I system for which control and interface components are manufactured by Intel Corporation consistent with the standards for this bus also established by Intel Corporation.

Central processing unit 10 provides a number of signals which are used in controlling the operation of the system shown in FIG. 1 and in controlling additional parts of the system not shown in FIG. 1. Among those which are of special interest in the following description, are two signals called Select Zero and Select One, which are designated here as S∅ and S1. These are command signals which will be used to control the period of time until another interrupt of a certain kind will be accepted by central processing unit 10. Another two signals provided by the CPU, the release signal and the debounce signal, are used to indicate when the system can accept indications in an external signal that an object of interest has reached the proper place in the scene being sensed by camera 12 to acquire its image. These signals are designated here DEBNC and RELEASE.

A video camera, 12, is used as a transducer to acquire images of scenes which are in its optical sensing field, and to provide corresponding electrical signals, or image signals, representing the image acquired. The image is acquired in camera 12 by a charge-coupled device- photo detector array in a monolithic integrated circuit placed at the focal plane of the optical system. Such a camera is available from PULNix America, Inc. having as a model number TM34KBCX-0.

The image signals supplied by camera 12, which are of the nature described above, are shown provided in FIG. 1 to an image storage module, 13. Image storage module 13 performs analog-to-digital conversions of samples of the analog signal portions obtained from camera 12, and stores the resulting digital representations of the image for a frame in a buffer memory therein. Module 13 also has a second buffer memory therein so that it can acquire the information from a subsequent frame from later signals provided by camera 12 while manipulations are occurring on the data already stored from the preceding frame.

Module 13 also provides several marking or timing signals concerning the sequence of frames and the sequence of scans within a frame serving as a basis for directing scans in a monitor obtained from camera 12, these marking or timing signals being related to the aforementioned horizontal and vertical blanking and synchronizing pulses. Among these signals are "horizontal carry", designated here as HC, which is closely related to the horizontal synchronizing pulses in the video signals. There is also provided a signal "vertical reset", designated here as VR, which is closely related to the vertical synchronizing pulses in the video signals.

A further signal is provided by module 13 as an indication of which of the two fields is occurring inside a frame, the odd field or the even field. This signal is designated FRAME. The clocking signal used for module 13 is conveniently a basis for developing clock signals for other parts of the system, and this clock signal provided in module 13 is designated STORCLOCK. A further timing signal for module 13 which is used as a basis for resetting timing circuitry in supporting the development of clocking signal is a signal termed CYCRESET.

A suitable image storage module 13 can be obtained from commercial sources. One such module is contained on a circuit board from Data Cube Corporation, Model VG-121. Note that module 13 has a very restricted access to port P1 of communication bus 11, access being made for just certain utilitarian purposes. Data flow into and out of module 13 to other parts of the image storage and manipulation system, on the other hand, goes by way of a second port in communication bus 11, this port being designated P2.

Module 13 is connected by virtue of port P2 of communication bus 11 to a further module for providing manipulations of the image data acquired in module 13. This module in FIG. 1 is an address sequencer interface module, 14. Communication, generally, with image storage module 13, for data purposes, occurs through address sequencer interface module 14, and in part from connection of module 14 with port P1 of bus 11. The data flow pathway through module 14 for communication with image storage module 13 is also used by other portions of the image storage and manipulation system shown as a dashed line box, 15 which includes the address generator. Address sequencer module 14 is directly connected with these other portions by way of a further interconnection arrangement, 16. The manipulations performed by address sequencer 14 and its corresponding address generator are more fully explained in the above-referenced patent and are not further described here. A fuller description is also found there of the other portions of the image storage and manipulation system of FIG. 1 mentioned to this point.

An illumination controller module, 17, shown in FIG. 1, is the means by which the intermittent illumination of objects in the sensing range of camera 12 is primarily controlled. The signals described as being provided by image storage module 13 are provided to controller 17 by communication bus 11 through port P2. The command signals described from central processing unit 10 are provided to controller 17 through port P1 of bus 11. Signals to be described which are provided from controller 17 to central processing unit 10 flow along port P1 of bus 11.

Controller 17 also receives the external signal earlier described indicating when an object is in the proper place in the scene sensed by camera 12 to have its image acquired. That arrangement is set out in FIG. 1 in highly simplified and schematic form as a switch, 18, which is shown being activated by an object of interest pushing this switch from an open to a closed position as that object achieves a suitable position in the scene for acquiring its image. In practice, a far more sophisticated arrangement may be used which could include use of indicator mechanisms such as photo cells, magnetic sensors or the like.

A series of objects of interest, 19, are shown moving sequentially past camera 12 by means of a conveyor belt, 20, supported on rollers, 21. This arrangement, too, is highly simplified for purposes of FIG. 1. Also, some of objects 19 are shown as having a "proper" shape, fully rectangular, and some objects being of an improper shape because of crushing, malformation or the like, as a suggestion of what an image storage and manipulation system may be used to sense. No implication is intended of any limitation of the kinds of scenes, or the kinds of objects of interest, or the kinds of inspections that are to be performed because of the simplified schematic diagram of such objects shown in FIG. 1.

Controller 17 also provides a control signal for controlling a stroboscopic illumination system, 22. Illumination system 22 can be provided in many forms and might typically be a xenon stroboscopic light. However, the illumination could be infrared radiation by use of a infrared emitting light emitting diode array, for instance. Again, the illumination could be provided as ultraviolet light with camera 12 being responsive only to fluorescence in objects which are illuminated by such ultraviolet light. Various filtering systems can be used to limit portions of the electromagnetic spectrum provided by illumination system 22 or portions of the spectrum received by camera 12. Thus, many illumination source possibilities exist and no limitation to any one of them is implied by the simplified schematic diagram shown in FIG. 1. A typical duration for a burst of illumination from illumination system 22 would be about 10 microseconds which provides relatively little integration time for accumulative charge at the photoreceptors. However, the intensity of the illumination provided will compensate sufficiently for this short integration time.

Figure 2:
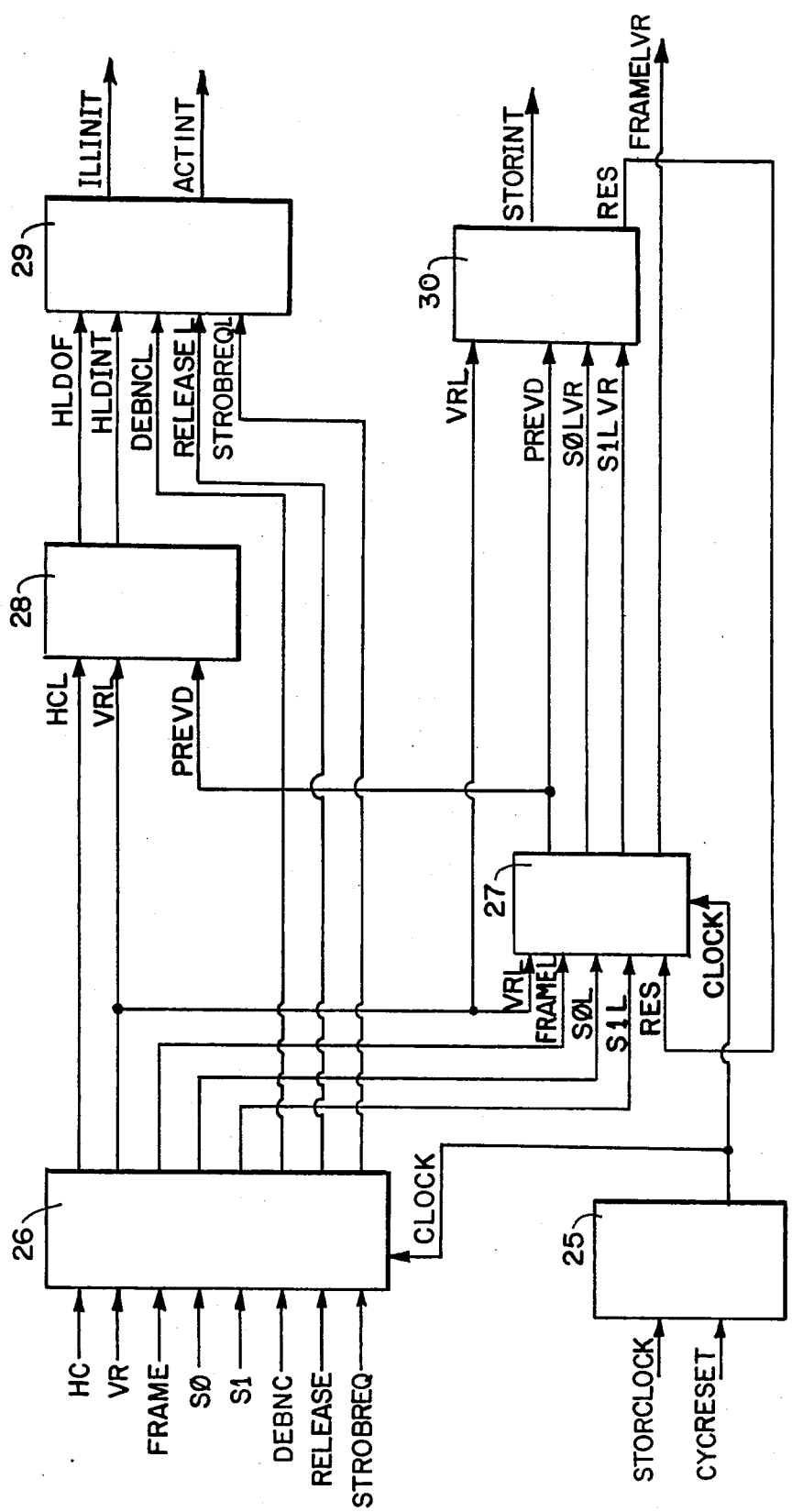
FIG. 2 shows a schematic system diagram of the controller.

Controller 17 is shown in more detail in FIG. 2. Note that all of the signals previously described as being available from central processing unit 10 and image storage module 13 are shown at the left hand side of FIG. 2. Signals STORCLOCK and CYCRESET are provided to an array of programmable logic gates, 25, used to form a counter and provide certain other logic functions to develop a clocking signal which is the used as a time base in operating controller 17. Thus, the output of the programmable array of logic 25 is a signal designated CLOCK.

CLOCK is provided to a synchronizing latch array, 26. The other signals provided to synchronizing latch array 26 are HC, VR, FRAME, S∅, S1, DEBNC, RELEASE and STROBREQ are caused by synchronizing latch array 26 to have any logic state shifts therein occur only in synchronism with logic state shifts in CLOCK. As a result, the signals out of synchronizing latch array 26 cause effects in other parts of the controller 17 only at times CLOCK is switching from one logic state to another. The signals out of synchronizing latch array 26 are designated the same way as the signals in except that an L is added thereafter to indicate the effect of synchronizing latch array 26.

CLOCK is also provided to another array, 27, of programmable logic to eliminate any differences in switching times remaining in signals from array 26 because such signals were so skewed in reaching array 26, and to develop certain signals at the output of array 27. A signal, PREVD, which provides an indication anticipating a vertical reset pulse in VRL, is provided based on the signals FRAMEL, which starts such an indication, and VRL, which ends such an indication. This signal is used to form an initiation point for counting in a further array, 28, of programmed logic which includes a counter.

VR is a signal developed by image storage module 13 which provides vertical reset pulses each of which immediately follows a series of horizontal synchronizing pulses in the video signals provided at a temporarily doubled rate. The pulses in such a series together form the vertical blanking indication in the video signals to be used for driving the vertical aspect of the scanning signals for operating a television monitor. Thus, VR occurs just at the start of new video information in a frame just after the completion of vertical blanking.

Camera 12 has a pulse generated in the charge-coupled device image acquisition integrated circuit therein that commands the photodetectors used therein to transfer the charge accumulated in acquiring a field to the transfer registers for transferring the video information out. During the duration of this charge transfer command pulse, the charge-coupled device integrated circuit receives an image at its photoreceptors which is unable to convert into a proper electrical signal image representation. Thus, in this duration, illumination system 22 should not be initiated for purposes of providing illumination to cause such an image to fall on that integrated circuit.

The duration of this charge transfer pulse is known for the camera in question to occur between the fifteenth and seventeenth pulses in the series defining the vertical blanking period, which series is reflected in signal HC. Thus, array 28 has a counter initiated by PREVD which counts pulses in signal HCL. At the times of the fifteenth and sixteenth such pulses after the initiation of the counting, an indication is provided in an output signal from array 28 designated HLDOF.

The counter formed in array 28 continues to count until this counting is terminated by a subsequent pulse in signal VRL. There is then formed a further signal in array 28 designated HLDINT indicating that a point has come for image storage module 13 that is acceptable for beginning to acquire and store representations of the image being provided by the image signals from camera 12 as a result of an illumination burst by illumination system 22. Image storage module 13 can only acquire data after a vertical reset pulse occurring in signal VR. If external signal switch 18 closes between the occurrence of a charge transfer pulse in the charge-coupled device integrated circuit within camera 12 and a next pulse in signal VR, and this illumination request signal were honored as a basis for starting the acquisition of the image data in module 13, only a partial field of data might be acquired as a result of the illumination from illumination system 22. By requiring image storage module 13 to wait to the beginning of the next field based on a subsequent vertical reset pulse in signal VR, acquisition of data for a full field is assured.

These two signals, HLDOF and HLDINT, are provided to a further array, 29, of programmable logic. Array 29 makes use of these signals, and signals synchronized through synchronizing latch array 26 from central processing unit 10 and external switch 18 to make decisions concerning the initiation of a burst of illumination by illumination system 22, and the times for storing video information from camera 12 in image storage module 13 at the command of central processing unit 10. Signals DEBNCL and RELEASEL from central processing unit 10 provide array 29 with the information that central processing unit 10 will permit an illumination response to a switching pulse in signal STROBREQ, which switching pulse can come at any time desired by the system user. The user need not synchronize such a request with the system operation in any manner. If a second pulse from external switch 18 appears in signal STROBREQL too soon after the previous one, array 29 will be prevented from responding to the second pulse by computer command signals DEBNCL and RELEASEL. Central processing unit 10 permits array 29 to respond to a pulse in signal STROBREQL due to closing switch 18 if the image acquired by camera 12 in response to the last such acquisition and the storage of the data therefrom in module 13, and any manipulation thereof, is complete.

If a pulse in signal STROBREQL, due to the closing of switch 18, is one which central processing unit 10 will permit the system to respond to, array 29 will ordinarily provide immediately thereafter a pulse at its output terminal which is electrically connected to illumination system 22 in a signal designated ILLINIT to initiate a burst of illumination. Bursts are allowed to occur, however, only if they would not also occur during the predetermined time set aside for transfer of charge from the photodetectors in the charge-coupled device integrated circuit of camera 12, an indication of which is represented in signal HLDOF. That is, a pulse for initiating illumination in signal ILLINIT will be delayed until the end of any coincident pulse in signal HLDOF indicating the occurance of such a transfer in camera 12. At the end of any such pulse in signal HLDOF, a pulse will typically be provided in signal ILLINIT to initiate an illumination burst from illumination system 22.

Array 29 also forms a second output signal which is provided to communication bus 11 at port P1 for transmission to central processing unit 10, this signal being an "action" interrupt signal designated ACTINT. This signal ordinarily provides central processing unit 10 immediately thereafter with the information that controller 17 has inititated an illumination burst from illumination system 22 and that the central processing unit should now command image storage module 13 to acquire and store the corresponding electrical image signals from camera 12. A pulse will not be provided in signal ACTINT, however, until signal HLDINT indicates that data can be acquired for a complete field as mentioned above, i.e. that a further pulse in signal VR has occurred since the last occurrence of a predetermined time during which charge is transferred from the photodetectors in the charge-coupled device integrated circuit in camera 12. If an illumination request occurs in STROBREQ after such a predetermined time begins but before a subsequent VR pulse, the pulse in ACTINT indicating that an illumination burst was initiated will be delayed until the subsequent pulse in VR does occur.

Thus, an object upon reaching the proper position in the scene being sensed by camera 12 will be subjected to a burst of illumination by system 22 in response to an external request signal from switch 18 indicating that the object has reached such a position. As a result, an image will be obtained of the scene including that object by camera 12 so that image signals representing that image can be stored in storage module 13 ready for manipulation by address sequencer interface module 14 and other portions 15 of the image storage and manipulation system. This image is acquired just when such an object gets to the right position in the scene so that the object will be properly positioned in any acquired image and, with stroboscopic lighting, appear as a sharp image without any blurring. Controller 17 permits this to be achieved despite certain portions of the video scanning period in which camera 12 is unable to provide image signals properly representing any image occurring on the charge-coupled device integrated circuit image plane in that camera.

The remaining portions of controller 17 shown in FIG. 2 are primarily devoted to process control activities. Once a pulse in signal ACTINT has been provided to central processing unit 10, central processing unit 10 issues commands via signals SØ and S1 which are first synchronized in synchronizing latch array 26 to form signals SØL and S1L, which are provided to array 27 where they are also forced to switch in coincidence with signal CLOCK to remove differences due to skew as earlier described. These signals at the output of array 27, now designated SØLVR and S1LVR, are then provided to a further array, 30, of programmable logic. There they initiate counting by a counter formed from the logic gates therein which count out the known periods of time for acquiring fields. The signals determine how many field acquisition time durations are to be counted based on values programmed into central processing unit 10 and, upon completion of such counting, a pulse is formed in a signal designated STORINT. STORINT is provided to central processing unit 10 through port P1 of communications bus 11 as an interrupt upon which central processing unit 10 acts to command image storage module 13 to stop acquiring signals from camera 12 for that frame. Array 30 also develops a reset signal designated RES which is provided back to array 27 which inhibits signals SØLVR and S1LVR from again initiating counting in array 30 until a further command to do so is received from central processing unit 10.

One further signal is generated by array 27, the signal FRAME from image storage module 13 is synchronized with logic state changes in the signal CLOCK in synchronizing latch array 26, and then further synchronized with logic state changes in the signal VRL in array 27 where it is then provided as an output signal designated FRAMELVR. This signal is brought by a special wiring arrangement to a slightly modified point in module 13 to permit acceptance thereof in image storage module 13. Thus, a signal reflecting the timing of a video frame and which is fully synchronized with the activities occurring on controller 17, in particular, the issuance of a pulse in signal ILLINIT to initiate illumination in system 22 is made available in image storage module 13 where it is conveniently available to central processing unit 10. Thereby, module 10 obtains the information as to which field of image signals, even or odd, was being acquired when a burst of illumination was initiated. Central processing unit 10, in response to a pulse in signal ACTINT directing image storage module 13 to acquire and store image signals representing the image, can then direct module 13 to begin on the opposite kind of field when it begins such acquisition and storage. This serves to maintain the sequence of alternating video fields being taken in pairs to form a video frame.

Although the present invention has been described with reference to preferred embodiments, workers skilled in the art will recognize that changes may be made in form and detail without departing from the spirit and scope of the invention.

What is claimed is:

1. A controller for controlling operation of an illumination source for use in intermittently illuminating selected objects to form images thereof on an image reception surface in an image transducer means which in response provides image signals representing said images with said image signals formed on a basis of being able to be used to reconstruct an image therefrom through periodic scanning by reconstructing means of an image reconstruction surface in a predetermined manner under control of said image signals, said image signals having corresponding first direction scanning and second direction scanning marking pulses therein to coordinate such scanning which marking pulses can be represented by a first scanning direction marking signal and a second scanning direction marking signal, respectively, said image signals being provided to an image signal manipulation system for storage and for manipulation therein with there also being an illuminating request signal provided to said controller which provides an indication in each instance that said illumination source is desired to provide illumination, said image transducer means having at least one predetermined portion of each scanning period during which said image transducer means can fail to properly provide said image signals in response to an image occurring on said image reception plane and during which illumination by said illumination source is to be prevented, said controller comprising:

a controller entry means for receiving a first direction controller signal representing at least some parts of said first scanning direction marking signal, for receiving a second direction controller signal representing at least some parts of said second scanning direction marking signal, and for receiving said illumination request signal;

a preventive delay means for receiving from said controller entry means a first entry signal representing at least some parts of said first direction controller signal and for receiving a second entry signal representing at least some parts of said second direction controller signal, said preventive delay means providing a first prevention signal for indications of any occurrances of any said predetermined portions in said scanning periods, and further providing a second prevention signal containing an indication of any occurrence of any said predetermined portions in said scanning periods that has yet to have occur thereafter a corresponding selected change in said first entry signal; and a decision and directing means for receiving from said preventive delay means said first and second prevention signals and for receiving from said controller entry means a third entry signal representing at least some parts of said illuminating request signal including said indications therein, said decision and directing means providing an illumination initiation signal at a terminal means thereof adapted for connection to said illumination source, said illumination initiation signal indicating that said illumination source is to provide illumination in a substantially immediate response to said indications in said third entry signal but to do so only after any delay imposed as a result of said indication in said first prevention signal, should any such indication in said first prevention signal be occurring coincident with a said indication in said illumination request signal, and said decision and directing means also providing a storage initiation signal to said image signal manipulation system indicating that said image signal manipulation system is to store said image signals from said image transducer means resulting from such illumination in response to said indication in said third entry signal but only after any delay imposed as a result of any said indication in said second prevention signal, should any such indication in said second prevention signal be occurring coincident with a said indication in said illumination request signal.

2. The apparatus of claim 1 wherein said controller entry means further comprises a synchronizing means for receiving said first and second direction controller signals and said illumination request signal, said synchronizing means providing as said first entry signal a synchronized first direction controller signal, as said second entry signal a synchronized second direction controller signal, and as said third entry signal a synchronized illumination request signal, said synchronizing means being capable of having said synchronized first direction controller signal, said synchronized second direction controller signal, and said synchronized illumination request signal each have any logic state changes occurring therein occur only in substantial coincidence with logic state changes occurring in a controller clocking signal.

3. The apparatus of claim 1 wherein said image transducer means has its image reception surface formed by an integrated circuit having photodetectors which can store charges generated by said illumination forming images thereon.

4. The apparatus of claim 1 wherein said illumination is provided by visible light.

5. The apparatus of claim 1 wherein said illumination is provided by infrared radiation.

6. The apparatus of claim 1 wherein said controller provides a signal to said image signal manipulation system after said indication in said storage initiation signal indicating that said image signal manipulation system is to then discontinue storing image signals received from said image transducer means.

7. The apparatus of claim 1 wherein said controller provides a signal to said image signal manipulation system indicating where in said scanning for image reconstruction said indication in said storage initiation signal occurred.

8. The apparatus of claim 2 wherein said controller clocking signal is formed based on signals supplied by said image signal manipulation system.

* * * * *